P. JENSEN.
REVERSING FAN.
APPLICATION FILED AUG. 8, 1919.
1,347,377.
Patented July 20, 1920.
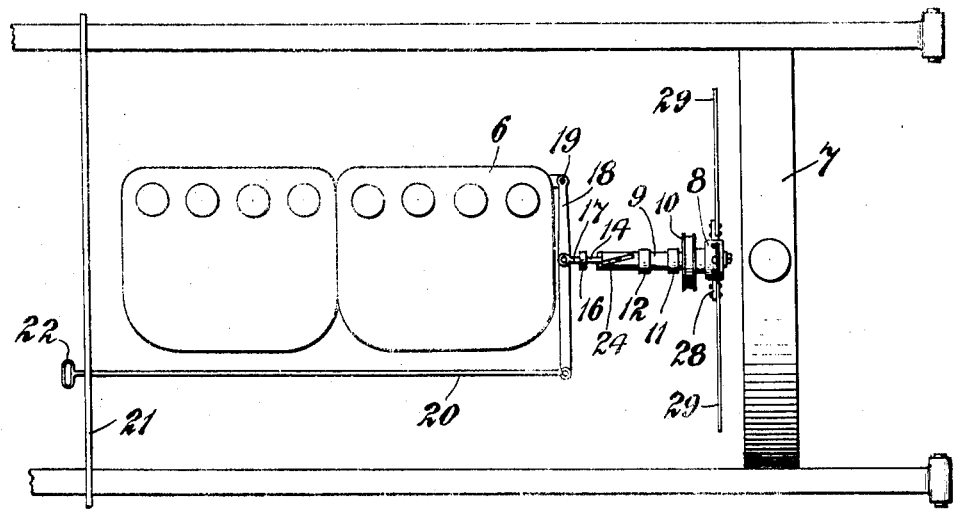
Fig. 1
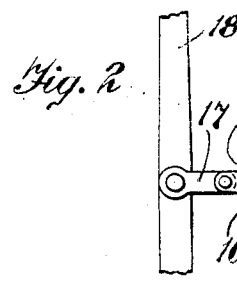
Fig. 2
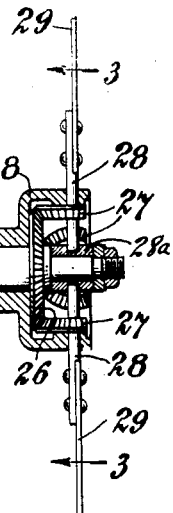
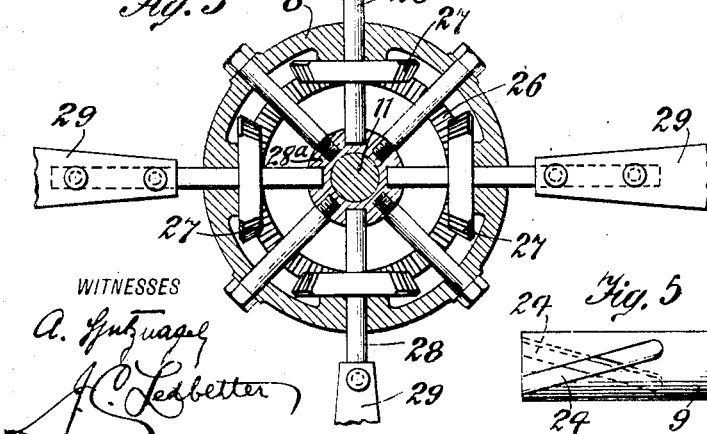
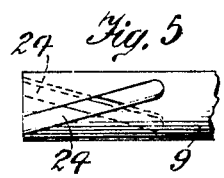
Fig. 5
WITNESSES
A. Gutzwagel
J. C. Ledbetter
INVENTOR
Peter Jensen
BY
Winner
ATTORNEYS

UNITED STATES PATENT OFFICE.

PETER JENSEN, OF WAYNE, ALBERTA, CANADA.

REVERSING FAN.

1,347,377.  Specification of Letters Patent.  Patented July 20, 1920.

Application filed August 8, 1919. Serial No. 316,213.

*To all whom it may concern:*

Be it known that I, PETER JENSEN, a subject of the King of Denmark, and a resident of Wayne, Province of Alberta, and Dominion of Canada, have invented a new and Improved Reversing Fan, of which the following is a full, clear, and exact description.

This invention relates to fans, and particularly to fans for circulating air about automobile engines and through automobile radiators. Especially the invention relates to a reversible fan to be used for this purpose.

An object is to provide a radiator cooling fan of the reversible type which is controllable from the driver's seat so that the volume of air displaced by the fan can be varied to suit the temperature needs of the automobile engine.

It is a purpose to provide an automobile radiator fan fitted with reversing mechanism which is conveniently controllable from the seat of the driver to increase the angular setting or pitch of the blades in case the engine becomes too warm, and to decrease the pitch of the blades should the engine become too cold. In this way the engine temperature can be maintained to secure maximum efficiency and economy.

With the above principal objects, and others, in view, the invention has relation to a variable pitch fan mechanism, an example of which is described herein, pointed out in the appended claim, and portrayed in the accompanying drawings, wherein:

Figure 1 shows a plan view of an automobile engine and radiator with a variable pitch fan disposed therebetween to function as is the purpose of this invention.

Fig. 2 shows a longitudinal section through the fan mechanism.

Fig. 3 is a front view thereof, and Fig. 4 is a view taken on the line 4—4 of Fig. 2.

Referring now more in particular to the drawings for an example of the structural features, the numeral 6 points out an automobile engine, and 7 the radiator therefor. The cooling fan is mounted between the engine and radiator as is the usual practice in automobile design.

The present drawings illustrate an example only of my variable pitch automobile fan, and variance in design or re-arrangement of structure, within the scope of the appended claim, is permissible.

Referring further to the drawings the reference 8 designates a gear casing carried on one end of a tube 9. A belt pulley 10 is fixed to the tube and employed to drive the tube and gear casing to revolve the fan. A shaft 11 is journaled in the tube and in the gear casing with one end thereof projecting through the gear casing.

The rear end of a shaft is provided with a longitudinal slot 12, and in this slot is slidably confined a shaft 14. A bore 12ª connects with the slot to receive the end of the shaft 14 and to guide same in longitudinal motion. The rear end of the shaft has a journal head 15 rotatably mounted in a bearing 16. The bearing 16 is carried on a link 17 which link is pivoted to a lever 18. The lever is pivoted at 19, and is provided with an actuating rod 20 which is guided in the automobile dash board 21. A handle 22 is made on the end of the rod so the automobile driver may actuate the rod to vary the pitch of the fan blades, as later seen.

Grooves 24 are cut in the tube 9 and assume a spiral contour. Two grooves are employed and disposed oppositely one to the other. A pin 25 is fixed in the shaft 14 with each end of said pin slidably confined in the grooves. It is seen how slight rotary motion may be impressed on the shaft 11 by pushing forward on the rod 20.

A bevel gear 26 is fixed on the shaft 9 and housed within the gear case. A number of pinions 27 mesh with the bevel gear. A fan blade shank 28 is fixed to each bevel gear, and the shank acts to support the pinion in mesh with the gear. The inner end of the shanks are supported in a cuff 28ª rotatably carried on the end of the shaft 11. Each shank mounts a fan blade 29, and the blades comprise a fan to function as an ordinary automobile radiator fan.

The fan assembly is driven by the pulley which rotates the tube, shaft and parts thereof, journaled upon the journal head 15 and other suitable bearings placed on the front end of the apparatus.

By pressing forward on the handle 22, the pin 25 follows the spiral contour of the grooves in the tube and thus rotates the shaft and as a consequence thereof, impresses a slight rotational movement on the shanks and fan blades. In this manner the pitch of the fan blades is varied from zero angle to maximum angle, and thus the air stream displaced by the fan, for cooling the engine and radiator, is varied to suit the temperature conditions of the engine.

This variable pitch fan control will find a broad range of use and adaptation on automobiles, trucks, and tractors, and will enable the driver to better care for the engine and at the same time derive maximum efficiency therefrom.

Having thus described my invention, what I desire to protect and secure by Letters Patent is:

A variable pitch fan mechanism for use in combination with automobile radiators, comprising a tubular shaft, a casing made on the tubular shaft, a gear transmission contained in the casing, fan blades related with the gear transmission, said shaft provided with a longitudinal bore and a transverse bore, a shaft confined in the longitudinal bore, a pin fixed to the shaft and confined in the transverse bore, the shaft having a journal-head bearing connection made on the outer end thereof, and a lever attached to the journal-head bearing connection to effect a change of the pitch of the fan blades.

PETER JENSEN.